US007016413B2

(12) United States Patent
Hall et al.

(10) Patent No.: US 7,016,413 B2
(45) Date of Patent: Mar. 21, 2006

(54) ADAPTIVELY ENCODING A PICTURE OF CONTRASTED COMPLEXITY HAVING NORMAL VIDEO AND NOISY VIDEO PORTIONS

(75) Inventors: Barbara A. Hall, Endwell, NY (US); Agnes Y. Ngai, Endwell, NY (US); Charles J. Stein, Peckville, PA (US); Everett G. Vail, III, Binghamton, NY (US); Edward F. Westermann, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 906 days.

(21) Appl. No.: 09/046,121

(22) Filed: Mar. 20, 1998

(65) Prior Publication Data

US 2002/0009146 A1    Jan. 24, 2002

(51) Int. Cl.
  *H04N 7/12* (2006.01)
(52) U.S. Cl. ............ 375/240.12; 375/240; 375/240.01
(58) Field of Classification Search ................ 348/409, 348/419, 470, 402, 390, 401, 384, 699, 700; 382/239; 392/236; 345/418
  See application file for complete search history.

(56) References Cited

U.S. PATENT DOCUMENTS

| | | | | |
|---|---|---|---|---|
| 4,703,358 A | * | 10/1987 | Flannaghan | 348/700 |
| 5,148,498 A | * | 9/1992 | Resnikoff et al. | 382/248 |
| 5,301,242 A | | 4/1994 | Gonzales et al. | 382/56 |
| 5,361,105 A | * | 11/1994 | Iu | 348/699 |
| 5,598,514 A | * | 1/1997 | Purcell et al. | 345/418 |
| 5,682,204 A | | 10/1997 | Uz et al. | 348/409 |
| 5,694,170 A | | 12/1997 | Tiwari et al. | 348/390 |
| 5,703,646 A | | 12/1997 | Oda | 348/401 |
| 5,719,632 A | | 2/1998 | Hoang et al. | 348/419 |
| 5,719,986 A | | 2/1998 | Kato et al. | 386/109 |
| 5,825,930 A | * | 10/1998 | Park et al. | 382/236 |

* cited by examiner

*Primary Examiner*—Allen Wong
(74) *Attorney, Agent, or Firm*—William H. Steinberg, Esq.; Kevin P. Radigan, Esq.; Heslin Rothenberg Farley & Mesiti, P.C.

(57) ABSTRACT

A technique is provided for adaptively encoding in hardware, software or a combination thereof a sequence of frames in real time, wherein one or more of the frames includes a random noise portion. The technique includes using statistics analysis to determine whether a current frame includes a random noise portion, and if so, to evaluate and dynamically encode each macroblock thereof based on activity level of the macroblock. Evaluating macroblock activity level includes determining whether its activity level exceeds a predefined threshold indicative of random noise. The macroblock is adaptively encoded by adjusting one or more coding parameters if the macroblock activity level is excessive and its target bitrate is low. For example, when the macroblock is within the random noise portion of the frame, the macroblock is biased towards being coded predictive and an adjusted quantization level is calculated to conserve bits used in encoding the macroblock, thereby moving encode bits from macroblocks within the random noise portion of the frame to macroblocks within the normal portion of the frame.

37 Claims, 8 Drawing Sheets fig. 1 fig. 2 fig. 3 fig. 4 fig. 5 fig. 6 fig. 7 fig. 8

ADAPTIVELY ENCODING A PICTURE OF CONTRASTED COMPLEXITY HAVING NORMAL VIDEO AND NOISY VIDEO PORTIONS

TECHNICAL FIELD

This invention relates in general to compression of digital visual images, and more particularly, to a technique for encoding one or more frames of contrasted complexity within a video sequence using image statistics derived from the frame(s) to dynamically change one or more controllable encoding parameter(s) used in encoding the frame(s).

BACKGROUND OF THE INVENTION

Within the past decade, the advent of world-wide electronic communications systems has enhanced the way in which people can send and receive information. In particular, the capabilities of real-time video and audio systems have greatly improved in recent years. However, in order to provide services such as video-on-demand and video conferencing to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of a video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, and variable length coding. Video compression between pictures is accomplished via a process referred to as motion estimation and compensation, in which a motion vector plus difference data is used to describe the translation of a set of picture elements (pels) from one picture to another.

The ISO MPEG-2 standard specifies only the syntax of bitstream and semantics of the decoding process. The choice of coding parameters and trade-offs in performance versus complexity are left to the encoder developers.

One aspect of the encoding process is compressing a digital video image into as small a bitstream as possible while still maintaining video detail and quality. The MPEG standard places limitations on the size of the bitstream, and requires that the encoder be able to perform the encoding process. Thus, simply optimizing the bit rate to maintain desired picture quality and detail can be difficult.

A video picture typically contains both busy and simple macroblock segments, and there is a high correlation between the segments. However, certain video frames are of highly contrasted complexity having, e.g., both normal video and noisy (or random) video portions within the frame, such as DIVA. Further, both the normal (or simple) video portion and the noisy portion are often moving from frame to frame. Within such a frame, most of the encode bits can be consumed by macroblocks of the noisy portion before picture coding is completed, thereby producing blockiness or artifacts within the picture and uneven output picture quality.

This invention thus seeks to enhance picture quality of an encoded video sequence having one or more pictures with areas of significantly contrasted complexity, and more particularly, to enhance picture quality by dynamically balancing picture bit allocation as the picture coding continues without requiring lengthy buffering or high computational intelligence.

DISCLOSURE OF THE INVENTION

Briefly summarized, the invention comprises in a first aspect a method for encoding a video frame having a noisy portion and a normal video portion. The method includes for each macroblock of the frame: determining a macroblock activity level; determining whether the macroblock activity level exceeds a predefined threshold, wherein the macroblock activity level exceeding the predefined threshold indicates that the macroblock is associated with the noisy portion of the video frame; and adjusting encoding of the macroblock when the macroblock activity level exceeds the threshold to conserve bits used in encoding the macroblock and thereby reduce the number of bits used to encode macroblocks within the noisy portion of the video frame.

In another aspect, a method is presented for encoding a frame of a sequence of video frames, each frame having a plurality of macroblocks. The method includes: determining whether the frame includes a random noise portion; and when the frame does include a random noise portion, evaluating each macroblock of the plurality of macroblocks in the frame and adjusting encoding of at least some macroblocks within the random noise portion of the frame, the adjusting of encoding comprising conserving bits used in encoding the at least some macroblocks within the random noise portion of the frame.

In still another aspect, a system for encoding a frame having a noisy portion is provided. The system includes means for determining a macroblock activity level and means for determining when the macroblock activity level exceeds a predefined threshold. The macroblock activity level exceeding the predefined threshold is indicative that the macroblock is associated with the noisy portion of the frame. The system further includes means for adjusting encoding of the macroblock when the macroblock activity level exceeds the predefined threshold in order to reduce bits used in encoding the macroblock, and thereby conserve bits otherwise used to encode macroblocks within the noisy portion of the frame.

In a further aspect, a system is provided for encoding a frame of a sequence of frames. This system includes a pre-encode processing unit for determining whether the frame includes a random noise portion, and a control and encode unit for evaluating each macroblock of a plurality of macroblocks comprising the frame when the frame includes the random noise portion. The control and encode unit includes means for adjusting encoding of at least some macroblocks within the random noise portion of the frame to reduce bits used in encoding the macroblocks within the random noise portion.

In still other aspects, the concepts presented herein are implemented within computer program products having computer usable medium with computer readable program code means therein for use in encoding a frame as summarized above.

Advantageously, processing in accordance with the present invention prevents noisy macroblocks or blocks with random details from consuming all or most of the picture bits, which in turn prevents overproduction of bits before the encoder reaches the bottom of the picture. This invention essentially directs encode bits from the random, busy macroblocks to the simpler, normal macroblocks. Less bits are used in the highly active and fine detailed area, thereby providing a more constant picture quality.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 6 shows a generalized encode system 300 in accordance with the present invention. System 300 includes pre-encode statistics analysis 310 to determine whether an input picture comprises a picture of contrasted complexity and based thereon whether one or more encoding parameters should be varied for individual macroblocks of the picture. The modified encoding parameters are used by encode engine 320 in encoding the individual macroblocks of the picture.

BEST MODE FOR CARRYING OUT THE INVENTION

The invention relates, for example, to MPEG compliant encoders and encoding processes such as described in "Information Technology-Generic coding of moving pictures and associated audio information: Video," Recommendation ITU-T H.262, ISO/IEC 13818-2, Draft International Standard, 1994. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

Further, the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in a still picture of an "I" frame picture. Spatial redundancy is the redundancy within a picture. The MPEG-2 Draft Standard is using a block based method of reducing spatial redundancy. The method of choice is the discrete cosine transformation, and discrete cosine transform coding of the picture. Discrete cosine transform coding is combined with weighted scalar quantization and run length coding to achieve desirable compression.

The discrete cosine transformation is an orthogonal transformation. Orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are organized into a zig-zag or alternate-scanned pattern, and converted into run-amplitude (run-level) pairs. Each pair indicates the number of zero coefficients and the amplitude of the non-zero coefficient. This is coded in a variable length code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

Figure 1:
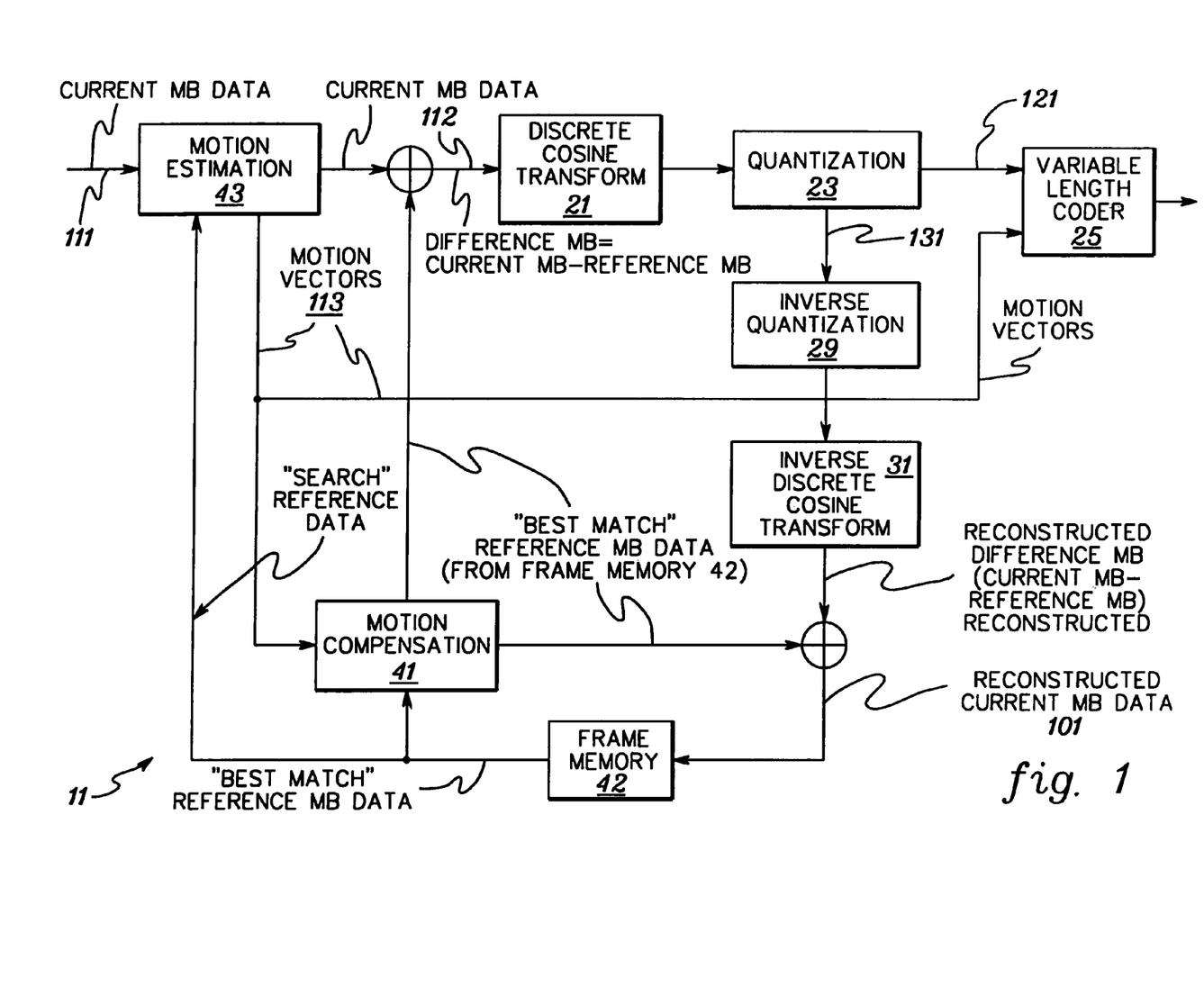
FIG. 1 shows a flow diagram of a generalized MPEG-2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113 (to motion compensation 41 and to variable length coder 25), the picture output 121, the feedback picture for motion estimation and compensation 131, and the motion compensated picture 101. This figure has the assumptions that the $i^{th}$ picture exists in frame memory or frame store 42 and that the $i+1^{th}$ is being encoded with motion estimation.

For purposes of illustration, a generalized flowchart of MPEG compliant encoding is shown in FIG. 1. In the flowchart the images of the $i^{th}$ picture and the $i+1^{th}$ picture are processed to generate motion vectors. The motion vectors predict where a macroblock of pixels will be in a prior and/or subsequent picture. The use of the motion vectors is a key aspect of temporal compression in the MPEG standard. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation Unit 41 to retrieve macroblock data from previous and/or future pictures, referred to as "reference" data, for output by this unit. One output of the motion compensation Unit 41 is negatively summed with the output from the motion estimation unit 43 and goes to the input of the Discrete Cosine Transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
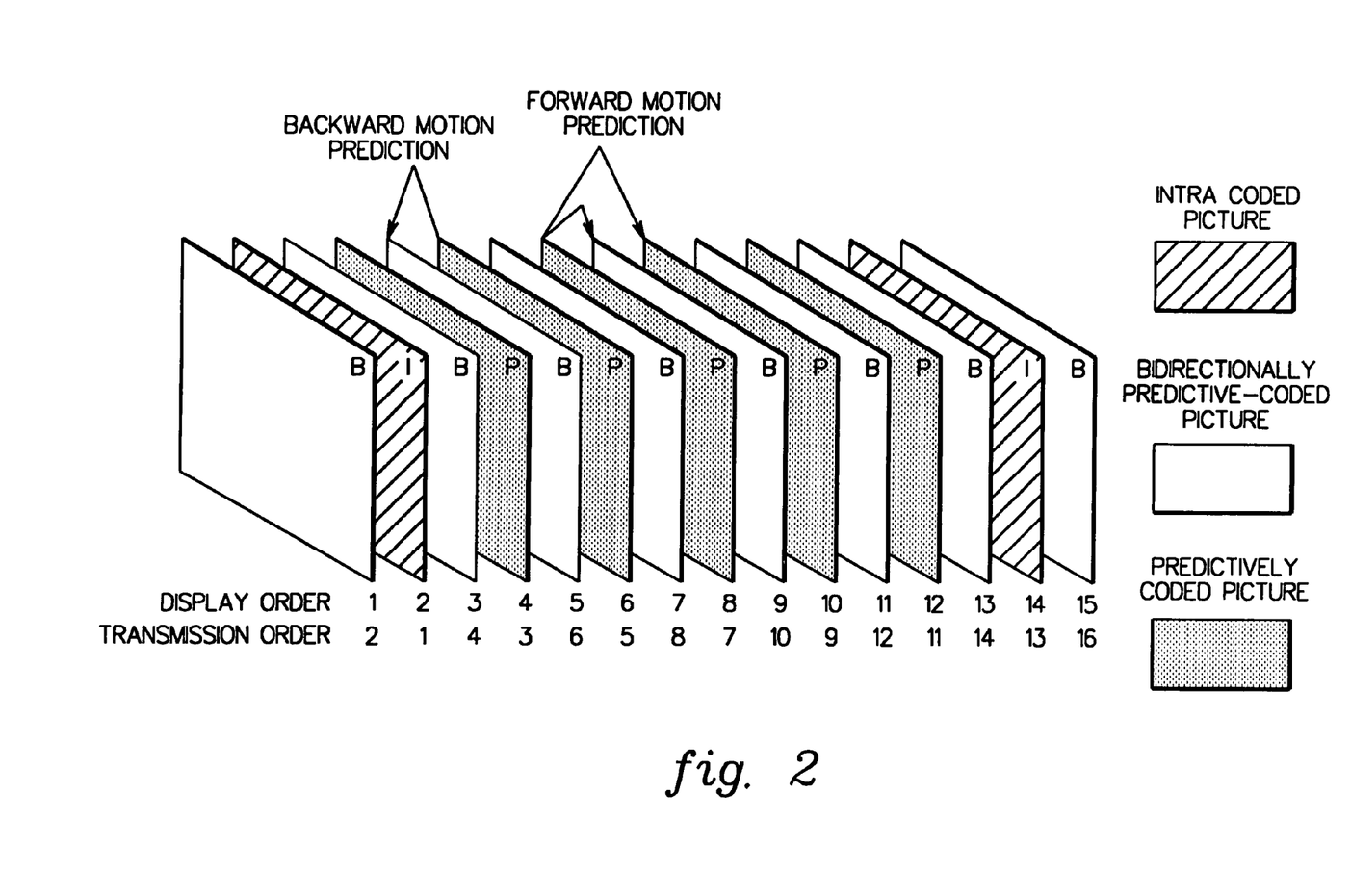
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation. Motion vectors are generated from "I" and "P" pictures, and are used to form "P" and "B" pictures.

Figure 3:
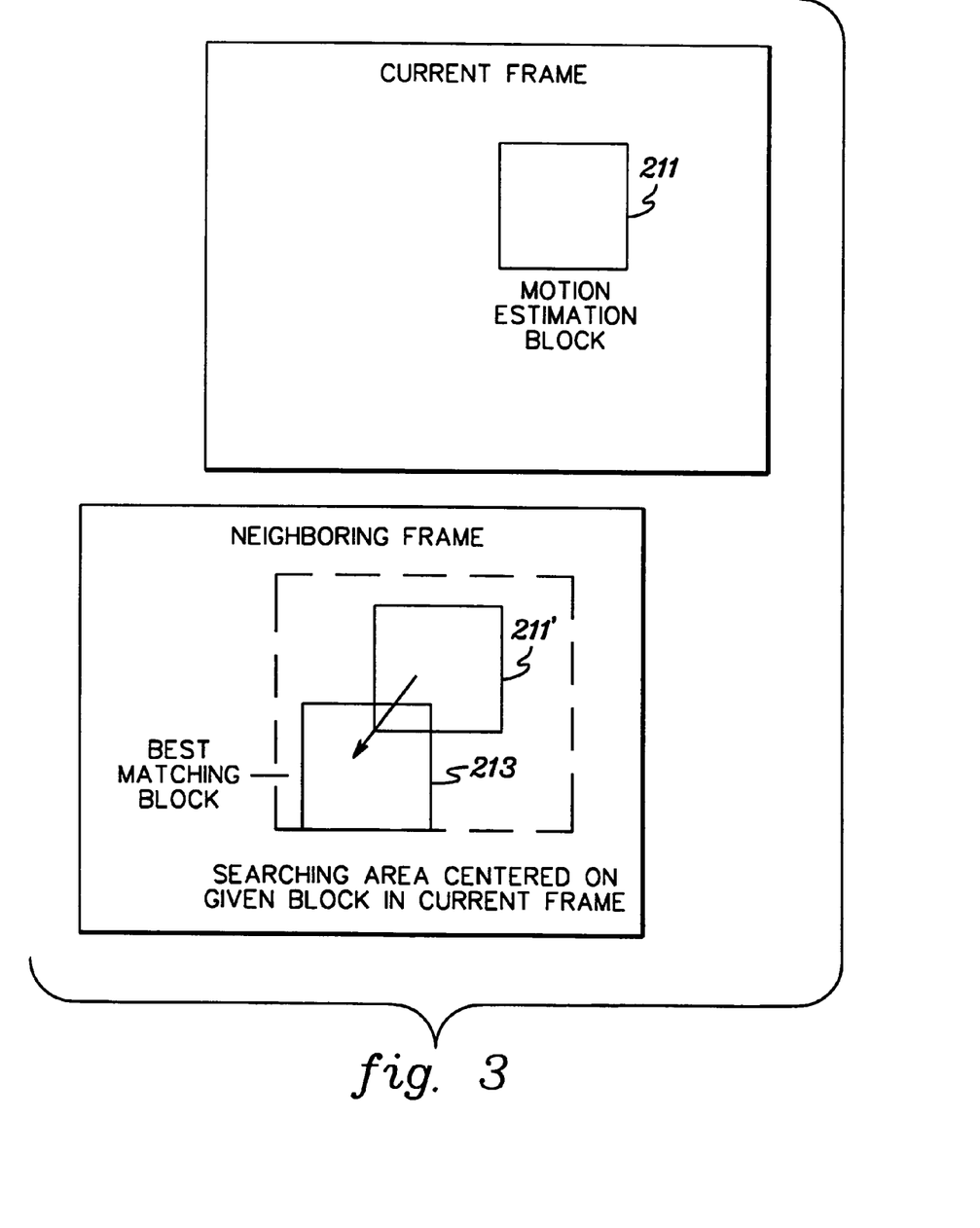
FIG. 3 illustrates the search from the motion estimation block in the current frame or picture to the best matching block in a subsequent or previous frame or picture. Elements 211 and 211' represent the same location in both pictures.
Figure 4:
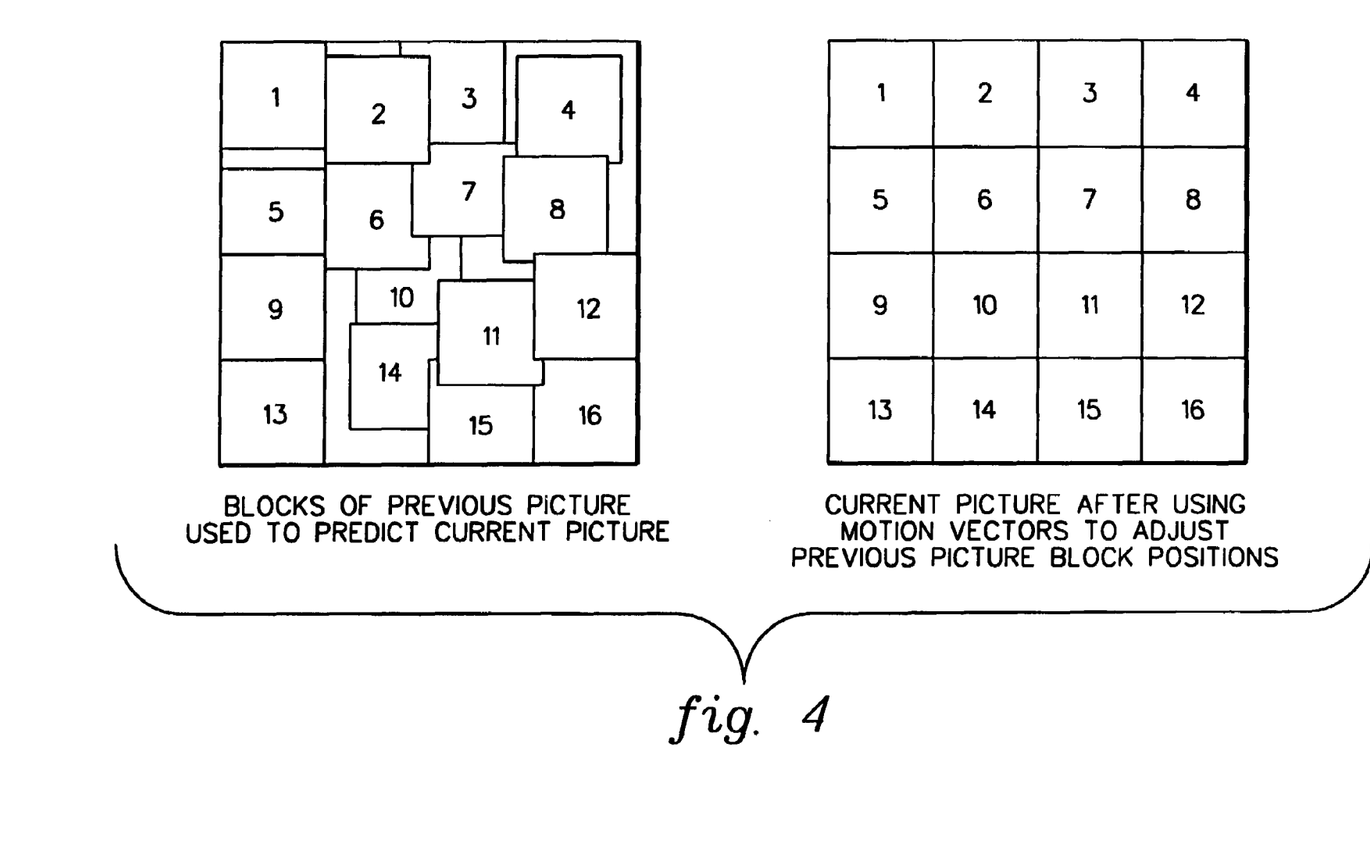
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, we look for a good match by starting from the same location in the $i^{th}$ picture as in the $i+1^{th}$ picture. A search window is created in the if picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG-2 encoder are discussed in detail in commonly assigned, co-pending U.S. patent application Ser. No. 08/831,157, by Carr et al., filed Apr. 1, 1997, entitled "Control Scheme For Shared-Use Dual-Port Predicted Error Array," which is hereby incorporated herein by reference in its entirety.

Encoder performance and picture quality are often enhanced today through the use of adaptive quantization. Examples of adaptive quantization are presented in co-pending, commonly assigned U.S. patent applications by Boroczky et al., entitled "Adaptive Real-Time Encoding of Video Sequence Employing Image Statistics," filed Oct. 10, 1997, Ser. No. 08/948,442, and by Boice et al., entitled "Real-Time Variable Bit Rate Encoding of Video Sequence Employing Image Statistics," filed Jan. 16, 1998, Ser. No. 09/008,282, both of which are hereby incorporated herein by reference in their entirety.

Adaptive quantization can be used to control the amount of data generated so that an average amount of data is output by the encoder and so that this average will match a specified bitrate. As one approach, video quality of a picture having a noisy video portion can be balanced by channeling bits from the noisy or high activity macroblocks to the normal portion of the picture. For example, sophisticated pre-processing might initially be used to determine how picture target bits are to be allocated among all the macroblocks of a picture having noisy video. However, there are 1350 macroblocks in a NTSC picture and 1440 macroblocks in a PAL picture, and the amount of preprocessing logic to accomplish this approach would require significant buffering and a large amount of computational intelligence.

As a preferred approach, presented herein is a novel design for dynamically balancing picture bit allocation within a highly contrasted picture having normal video and noisy video sections as picture coding continues without significant buffering of the picture and without requiring large computational intelligence to accomplish balancing of the bit allocation.

Figure 5:
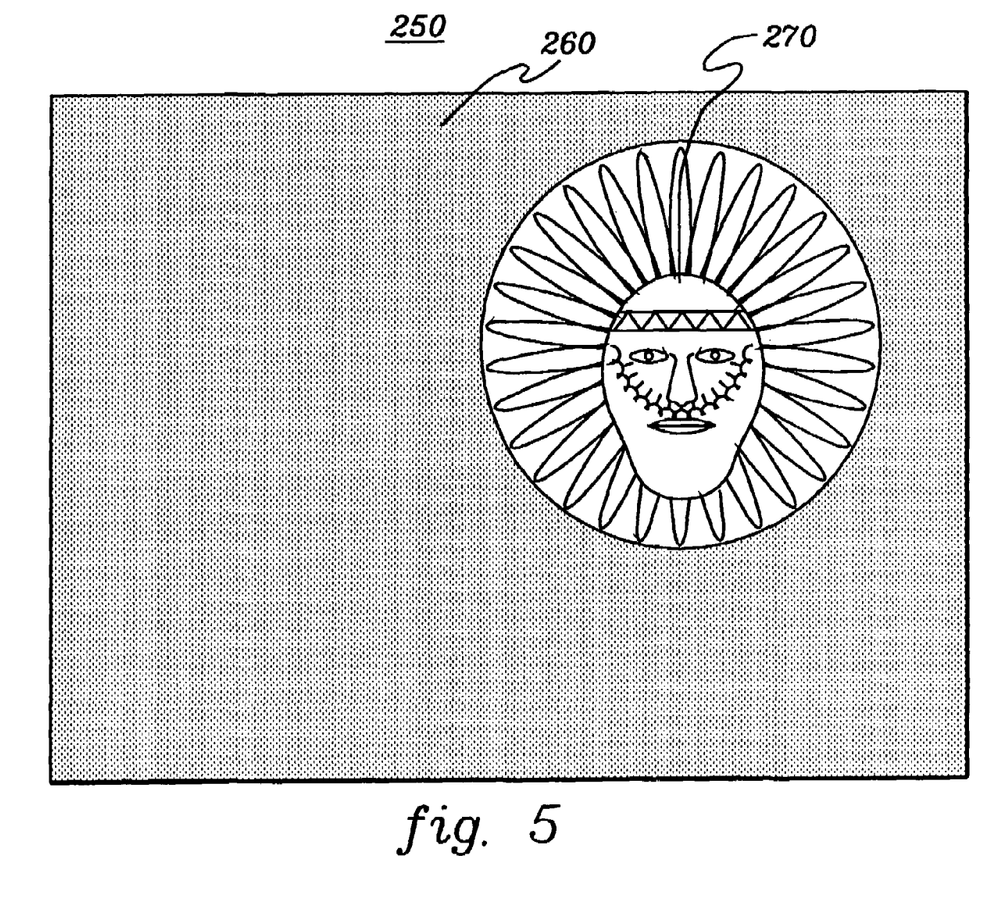
FIG. 5 depicts one embodiment of a frame of contrasted complexity having normal video and noisy random video portions to be processed in accordance with the adaptive encoding of the present invention.

FIG. 5 depicts one embodiment of a picture 250 of contrasted complexity having a random noise portion 260 and a normal video portion 270. As used in this application, a "contrasted picture" or "picture of contrasted complexity" means any picture having a first area of high or random activity and a second area of significantly lower activity.

"Noisy video" is used herein to denote a picture or that portion of a picture having very high complexity, such as a picture portion having randomly moving dots of different color. "Normal video" is used to mean a picture or portion of a picture depicting, for example, a conventional motion picture image. FIG. 5 is thus shown by way of example only and those skilled in the art will understand that a frame having contrasted complexity sections of "normal video" and "noisy video" can encompass many variations.

In accordance with this invention, the complexity of each input picture is statistically calculated as the picture is received by the encoder. This complexity measurement is tailored to indicate the degree of business or amount of detail within the picture. From picture complexity, an average complexity value for each macroblock can be determined. During the macroblock coding process, the encoder calculates the actual macroblock complexity and alters the coding options in accordance with this invention when picture complexity is above a predefined, experimentally determined complexity threshold, and the specified bitrate is lower than a predefined bitrate threshold. The complexity and bitrate thresholds can be selected experimentally by one skilled in the art in order to accomplish the objects of the present invention. Basically, this invention seeks to dynamically modify the coding algorithm when the bitrate is too low for the material to be encoded given that the current picture has been statistically determined to comprise a picture having a noisy portion of very high activity.

Changes to the coding algorithm can include adjusting the macroblock coding type and modifying the quantization level. For example, once a contrasted picture is identified, the macroblock coding type is preferably biased towards being coded predictive, that is, it requires a larger prediction error before a macroblock will be coded as intra. When the macroblock is coded as intra, the macroblock is thus truly different from the prior reference picture. Since intra macroblocks take many more bits to code than predictive macroblocks, the quantization level of these macroblocks is also adjusted to conserve bits.

For example, a more precise quantization level can be determined from an activity value that is a better representation of the macroblock to be encoded. The relative activity of each block in a macroblock is examined, and the block activity that is exceptionally far from the rest is discarded. In one embodiment, the block activities can be prioritized and the smallest activity value is compared to the next smallest one. If the block with the smallest amount of activity is one-half or less the block with the next smallest activity, and is one-half or less the average activity within the macroblock, then that block with the lowest activity is preferably ignored in the quantization level calculation. The calculated quantization level can also be increased by a percentage determined from experiments. Again, the goal is to conserve bits when encoding macroblocks of the noisy video portion, thereby providing more bits for encoding macroblocks within the normal video portion.

Figure 6:
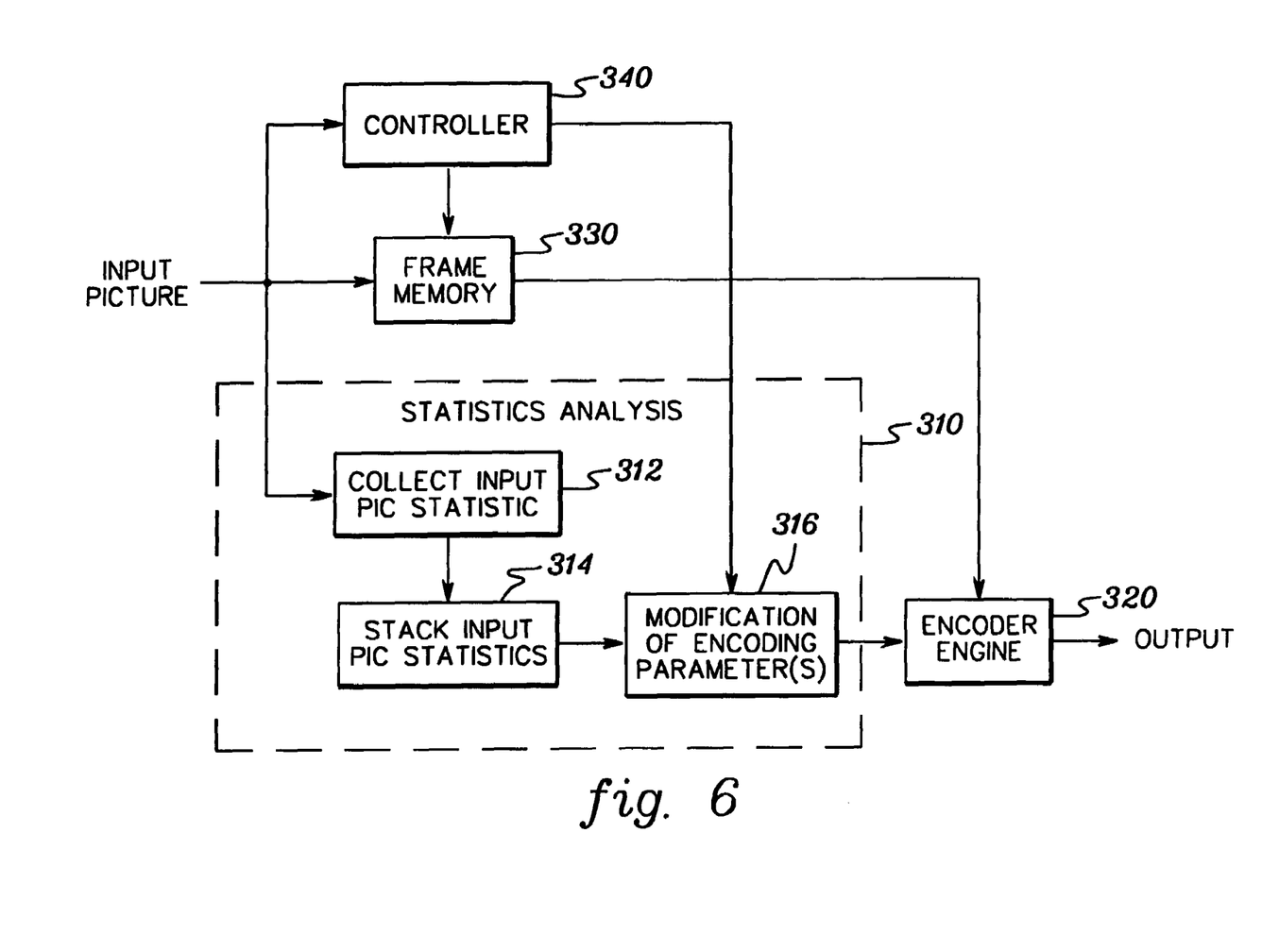

FIG. 6 depicts one embodiment of an encode system, generally denoted 300, in accordance with this invention. As shown, an input stream of video frames is conventionally buffered in frame memory 330. Controller 340 determines where a given input picture should be placed within the memory, as well as when to encode the picture. While buffered, preprocessing of the input stream by statistics gathering and analysis 310 is performed in accordance with the invention. Pre-encode stage 310 gathers and analyzes statistics on each frame of the sequence of video frames to determine whether the frame has high complexity indicative of noisy video and places the below-described statistics into a stack 314. Stacking of input picture statistics is needed because the GOP structure employed in MPEG encoding of a sequence of video frames may have to be reordered prior to encoding.

When a given frame is to be encoded, preprocessing 310 thus analyzes the frame to determine whether one or more encoding parameters should be adjusted on a macroblock level. As described further below, adjustable parameters may include macroblock coding type and macroblock quantization level. This information is forwarded to the encoder engine 320 commensurate with retrieval of the frame to be compressed from memory 330. Unless otherwise stated herein, encode engine 320 can comprise conventional MPEG compression processing as summarized initially herein.

By way of example, statistics analysis 310 determines whether the current frame has high complexity by determining a statistic equal to an accumulation of the absolute values of differences between pairs of adjacent pixels in the frame. This accumulation is referred to herein as "PIX-DIFF". PIX-DIFF can be determined by imagining, for example, the luminance data lines of the current picture concatenated to form a long line of luminance samples. Then for a given picture, the equation for the PIX-DIFF statistic might be:

$$PIX - DIFF = \sum_{y=1,3,5...}^{Max} |L_y - L_{y+1}|$$

Where: y is the pixel position number from "1" to the maximum number of pixels in the concatenated string of pixels. The PIX-DIFF statistic essentially comprises finding the difference between two adjacent luminance pixels in this concatenated string of luminance data for the frame and then summing the absolute values of those differences. As an alternative, PIX-DIFF could be defined as an accumulation of both luminance and chrominance data for the current frame, or an accumulation of chrominance data only.

Figure 7:
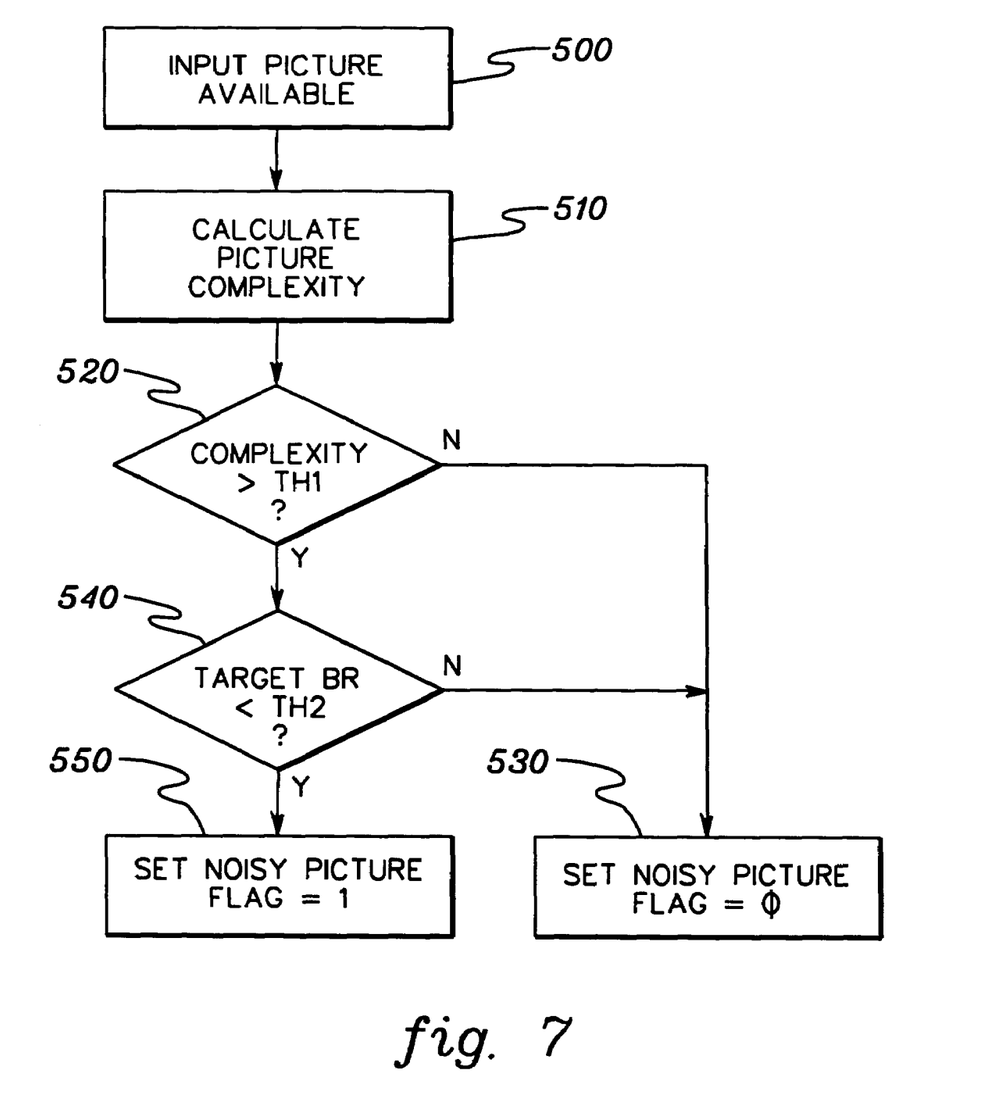
FIG. 7 is a flowchart of one embodiment of identifying a current frame of a sequence of video frames as comprising a frame with a noisy or random portion for processing in accordance with the present invention.

FIG. 7 depicts one embodiment for statistics gathering and analysis in accordance with this invention. Upon an input picture being available 500, statistics processing calculates picture complexity 510 by determining a PIX-DIFF value for the picture. A picture with a noisy portion of random detail will have a very high PIX-DIFF value, and thus high complexity. The calculated complexity or PIX-DIFF is compared against an experimentally determined, predefined complexity threshold (TH 1) 520.

Applicants have discovered that in measuring the PIX-DIFF value for a normal video portion and comparing it to video having a noisy portion, the noisy portion has a significantly higher PIX-DIFF value. Thus, if the PIX-DIFF for the frame is less than the predefined threshold, a noisy picture flag is set to "0" 530, meaning that the picture comprises normal video only. However, if the complexity of the picture is high (meaning that the frame contains a noisy portion), then the target bitrate for the picture is examined. When the bitrate is high (for example, 50 Mbits), there may be sufficient bits to encode even a picture with normal and noisy video portions. Conversely, if the bitrate for the frame is low, e.g., 4 Mbits, then there may be insufficient bits to adequately encode the frame. Under this scenario, the encoding options are preferably modified in accordance with this invention. Thus, when the bitrate for the frame is greater than a predefined bitrate threshold (TH 2), the noisy picture flag is set to "0" 530, and when the bitrate is less than this threshold, the noisy picture flag is set to "1" 550. The processing of FIG. 7 thus results in the setting of a "noisy picture" flag to either "0" or "1". In one embodiment, this flag can be within the statistics analysis 310 preprocessing (FIG. 6) and is accessible by the encoder engine 320 upon commencement of encoding of the current frame.

Figure 8:
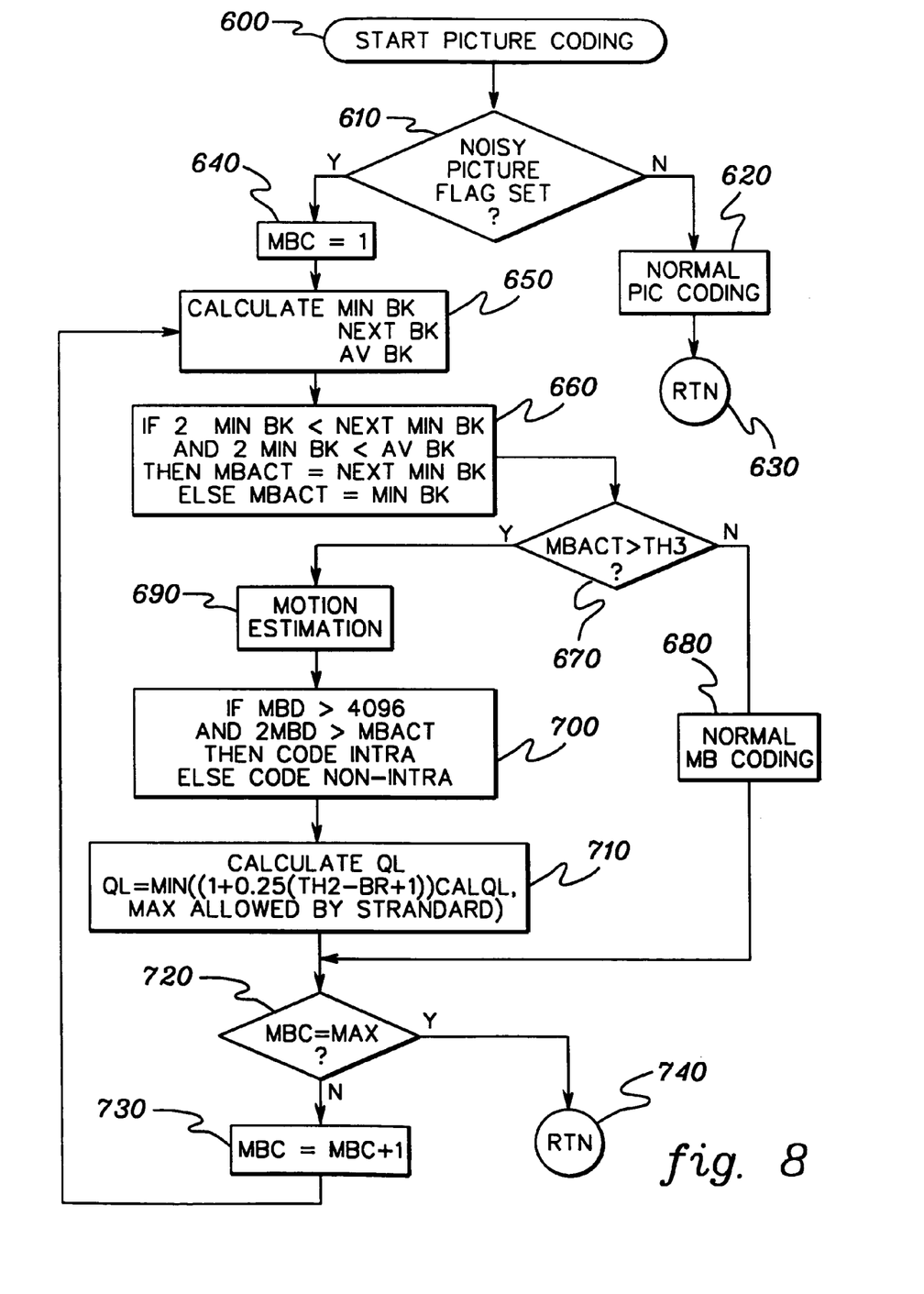
FIG. 8 is a flowchart of one embodiment of adaptively encoding a picture having a noisy video portion in accordance with the present invention.

FIG. 8 presents one embodiment for adapting encoding of a picture having a noisy video portion in accordance with the present invention. Picture encoding 600 begins by checking whether the noisy picture flag (FIG. 7) has been set 610. If the noisy picture flag is "0", then normal picture encoding 620 is employed. Upon completion of normal picture coding, the encode engine returns 630 to encode the next picture in a sequence of pictures.

On the other hand, if the noisy picture flag has been set, then the macroblock counter is set to "1" 640 and an activity level for each block in the first macroblock is determined 650. The four blocks of the macroblock are ordered based upon their activity level from minimum to maximum and an average block activity is determined from the four values.

If two times the minimum activity level of the blocks is less than the activity level of the next to minimum block in the macroblock, and two times the minimum activity level in the macroblock is less than the average activity level of the blocks in the macroblock, then the macroblock activity is set to a value equal to the activity level of the next to minimum block in the macroblock. Otherwise, the macroblock activity is set to the minimum activity level in the macroblock 660.

Once the macroblock activity level is set, it is compared against a predefined activity threshold (TH 3) 670. If macroblock activity is below the threshold, then normal macroblock coding 680 is performed; and processing determines whether the macroblock count is at the maximum for the picture 720. If not, the macroblock count is incremented 730 and the activity level for the next macroblock in the picture is calculated. Otherwise, encode processing has been completed, and return is made to process a next picture in the sequence 740.

If the macroblock activity level is greater than the predefined activity threshold (TH 3), then motion estimation is performed 690 and the prediction error or macroblock difference (MBD) is evaluated. If the MBD for the macroblock is greater than, for example, 4096 (4k) and 2×(MBD) is greater than the macroblock activity level, then the macroblock is coded as an intra (I) macroblock 700. Otherwise, the macroblock is coded as predictive. Once the coding type is determined, the quantization level is calculated 700. The adjusted quantization level is preferably defined as:

$$ADJ\ QL = MIN((1+0.25\ (TH2-BR+1)) \cdot CAL\ QL, MAX\ ALLOWED\ BY\ STANDARD)$$

Where:
BR is the target bitrate for the macroblock;
TH2 is a predefined bitrate threshold;
CAL QL is the calculated quantization level for the macroblock; and
MAX ALLOWED BY STANDARD is the maximum quantization allowed by MPEG standard.

Essentially, the quantization level is increased in order to conserve bits when the macroblock has high activity. Once the quantization level is determined, it is employed in encoding the macroblock. The macroblock count is then evaluated to determine whether all macroblocks in the picture have been encoded, and processing continues as described above.

Those skilled in the art will note from the description provided herein that processing in accordance with the present invention prevents noisy macroblocks or blocks with random details from consuming all or most of the picture bits, which in turn prevents overproduction of bits before the encoder reaches the bottom of the picture. This invention essentially directs encoding bits from the random, busy macroblocks to the simpler, normal macroblocks. Less bits are used in the highly active and fine detailed area, and thereby a more constant picture quality is obtained.

The present invention can be included, for example, in an article of manufacture (e.g., one or more computer program products) having, for instance, computer usable media. This media has embodied therein, for instance, computer readable program code means for providing and facilitating the capabilities of the present invention. The articles manufactured can be included as part of the computer system or sold separately.

The flow diagrams depicted herein are provided by way of example. There may be variations to these diagrams or the steps or operations described herein without departing from the spirit of the invention. For instance, in certain cases the steps may be performed in differing order, or steps may be added, deleted or modified. All these variations are considered to comprise part of the present invention as recited in the appended claims.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

The invention claimed is:

1. A method for encoding a frame having a plurality of macroblocks, said method comprising:
  using intraframe statistics to determine without reference to another frame whether said frame includes a random noise portion and a normal video portion, and if so, then for each macroblock of said frame:
   (i) determining a macroblock activity level;
   (ii) determining when said macroblock activity level exceeds a predefined threshold, wherein said macroblock activity level exceeding said predefined threshold indicates that said macroblock is associated with said random noise portion of said frame; and
   (iii) adjusting encoding of said macroblock when said macroblock activity level exceeds said predefined threshold to conserve bits used in encoding said macroblock by biasing coding of said macroblock associated with said noisy portion of said frame towards predictive coding and thereby save bits otherwise used to encode said random noise portion of said frame and provide a more constant picture quality due to encoding of the frame.

2. The method of claim 1, wherein said method comprises using said saved bits from said random noise portion of said frame to encode macroblocks associated with said normal portion of said frame.

3. The method of claim 1, wherein each macroblock of said plurality, of macroblocks comprises multiple blocks, and wherein said determining (i) comprises determining an activity level for each block of said multiple blocks of said macroblock, and deriving therefrom an activity level for said macroblock.

4. The method of claim 3, wherein said deriving comprises ordering activity levels of said multiple blocks of said macroblock and comparing a minimum activity level of said order with a next to minimum activity level of said order to derive said activity level for said macroblock.

5. The method of claim 4, wherein said comparing further comprises comparing said minimum activity level of said order with an average activity level of said multiple blocks of said macroblock to derive said activity level for said macroblock.

6. The method of claim 1, wherein said adjusting encoding (iii) comprises performing motion estimation on said macroblock and selectively adjusting macroblock coding type for said macroblock to bias said macroblock towards being coded predictive when said macroblock activity level exceeds said predefined threshold, said selectively adjusting being with reference to a predictive error value resulting from said performing motion estimation on said macroblock.

7. The method of claim 1, wherein said adjusting encoding (iii) comprises determining an adjusted quantization level for use in encoding said macroblock, said adjusted quantization level being determined to conserve bits used in encoding said macroblock when said macroblock activity level exceeds said predefined threshold.

8. The method of claim 1, wherein said determining whether said frame comprises said random noise portion includes calculating a frame complexity value and comparing said frame complexity value to a predefined complexity threshold.

9. The method of claim 8, wherein said determining whether said frame comprises a plurality of pixels, and wherein each pixel of said frame comprises a multi-bit value, and wherein said frame complexity value comprises an accumulated absolute difference value (PIX-DIFF) derived from adjacent pixels of said plurality of pixels of said frame.

10. The method of claim 9, further comprising setting a noisy picture flag to "0" when said frame complexity value is less than said predefined complexity threshold, wherein said flag set to "0" designates said frame as a non-noisy or normal frame.

11. The method of claim 9, wherein said determining whether said frame comprises said random noise portion further includes comparing a target bitrate for said frame to a predefined bitrate threshold and when said target bitrate for said frame exceeds aid predefined bitrate threshold, said method further comprises setting a noisy picture flag equal to "0", wherein said flag set to "0" designates said frame as a non-noisy or normal frame, and if said target bitrate is less than said predefined bitrate threshold, then setting said noisy picture flag to "1", wherein said "1" noisy picture flag setting indicates said frame includes said random noise portion.

12. A method for encoding a frame having a plurality of macroblocks, said method comprising:
    determining whether said frame includes a noisy portion, and if so, then for each macroblock of said frame:
    (i) determining a macroblock activity level;
    (ii) determining when said macroblock activity level exceeds a predefined threshold, wherein said macroblock activity level exceeding said predefined threshold indicates that said macroblock is associated with said noisy portion of said frame; and
    (iii) adjusting encoding of said macroblock when said macroblock activity level exceeds said predefined threshold to conserve bits used in encoding said macroblock and thereby save bits otherwise used to encode said noisy portion of said frame;
    wherein each macroblock of said plurality of macroblocks comprises multiple blocks, and wherein said determining (i) comprises determining an activity level for each block of said multiple blocks of said macroblock, and deriving therefrom an activity level for said macroblock;
    wherein said deriving comprises ordering activity levels of said multiple blocks of said macroblock and comparing a minimum activity level of said order with a next to minimum activity level of said order to derive said activity level for said macroblock;
    wherein said comparing further comprises comparing said minimum activity level of said order with an average activity level of said multiple blocks of said macroblock to derive said activity level for said macroblock; and
    wherein said comparing comprises determining whether said minimum activity level is less than one-half said next to minimum activity level and whether said minimum activity level is less than one half said average activity level of said multiple blocks, and when both are so, defining said activity level of said macroblock as said next to minimum activity level of said order, otherwise defining said activity level of said macroblock as said minimum activity level of said order.

13. A method for encoding a frame having a plurality of macroblocks, said method comprising:
    using intraframe statistics to determine without reference to another frame whether said frame includes a noisy portion, and if so, then for each macroblock of said frame:
    (i) determining a macroblock activity level;
    (ii) determining when said macroblock activity level exceeds a predefined threshold, wherein said macroblock activity level exceeding said predefined threshold indicates that said macroblock is associated with said noisy portion of said frame; and
    (iii) adjusting encoding of said macroblock when said macroblock activity level exceeds said predefined threshold to conserve bits used in encoding said macroblock and thereby save bits otherwise used to encode said noisy portion of said frame;
    wherein said adjusting encoding (iii) comprises performing motion estimation on said macroblock and selectively adjusting macroblock coding type for said macroblock to bias said macroblock towards being coded predictive when said macroblock activity level exceeds said predefined threshold, said selectively adjusting being with reference to a predictive error value resulting from said performing motion estimation on said macroblock; and
    wherein said selectively adjusting comprises determining when said predictive error is greater than a second predefined threshold and said predictive error is greater than one-half said macroblock activity level, and when both are so, adjusting a macroblock coding type parameter to bias- said macroblock towards being coded predictive.

14. A method for encoding a frame having a plurality of macroblocks, said method comprising:

using intraframe statistics to determine without reference to another frame whether said frame includes a noisy portion, and if so, then for each macroblock of said frame:
- (i) determining a macroblock activity level;
- (ii) determining when said macroblock activity level exceeds a predefined threshold, wherein said macroblock activity level exceeding said predefined threshold indicates that said macroblock is associated with said noisy portion of said frame; and
- (iii) adjusting encoding of said macroblock when said macroblock activity level exceeds said predefined threshold to conserve bits used in encoding said macroblock and thereby save bits otherwise used to encode said noisy portion of said frame;

wherein said adjusting encoding (iii) comprises determining an adjusted quantization level for use in encoding said macroblock, said adjusted quantization level being determined to conserve bits used in encoding said macroblock when said macroblock activity level exceeds said predefined threshold; and wherein said determining of said adjusted quantization level comprises calculating a quantization level (CAL QL) for said macroblock and defining said adjusted quantization level (ADJ QL) as:

$ADJ\ QL=MIN((1+0.25\ (TH2-BR+1))\cdot CAL\ QL;$
MAX ALLOWED BY STANDARD)

Where: BR is the target bitrate;

TH2 is a second predefined value; and

MAX QL ALLOWED BY STANDARD is a maximum quantization level allowed by MPEG standard.

15. A method for encoding a prime having a plurality of macroblocks, said method comprising:

using intraframe statistics to determine without reference to another frame whether said frame includes a noisy portion, and if so, then for each macroblock of said frame:
- (i) determining a macroblock activity level;
- (ii) determining when said macroblock activity level exceeds a predefined threshold, wherein said macroblock activity level exceeding said predefined threshold indicates that said macroblock is associated with said noisy portion of said frame; and
- (iii) adjusting encoding of said macroblock when said macroblock activity level exceeds said predefined threshold to conserve bits used in encoding said macroblock and thereby save bits otherwise used to encode said noisy portion of said frame;

wherein said determining whether said frame comprises said noisy portion includes calculating a frame complexity value and comparing said frame complexity value to a predefined complexity threshold;

wherein said frame comprises a plurality of pixels, and wherein each pixel of said frame comprises a multi-bit value, and wherein said frame complexity value comprises an accumulated absolute difference value (PIX-DIFF) derived from adjacent pixels of said plurality of pixels of said frame; and wherein said PIX-DIFF is defined as:

$$\sum_{y=1,3,5...}^{Max} |L_y - L_{y+1}|$$

Where: L represents luminance value of a pixel, and y represents pixel position within the frame.

16. A method for encoding a frame of a sequence of frames, each frame having a plurality of macroblocks, said method comprising:

using intraframe statistics to determine without reference to another frame whether said frame includes a random noise portion and a normal video portion; and when said frame includes said random noise portion and said normal video portion, evaluating each macroblock of said plurality of macroblocks in said frame and adjusting encoding of at least some macroblocks thereof within said random noise portion of said frame, said adjusting comprising reducing bits used in encoding said at least some macroblocks within said random noise portion by biasing coding thereof towards predictive coding.

17. The method of claim 16, wherein each frame of the sequence of frames comprises a plurality of pixels, each pixel of each frame comprising a multi-bit value, and wherein said determining whether said frame includes said random noise portion includes calculating a frame complexity value and comparing said frame complexity value to a predefined complexity threshold, said calculating of said frame complexity value including deriving an accumulated absolute difference (PIX-DIFF) from adjacent pixels of said plurality of pixels of said frame.

18. The method of claim 17, wherein when said frame complexity value is less than said predefined complexity threshold, said method further comprises setting a noisy picture flag to "0" and performing normal encoding on said frame, wherein said flag set to "0" designates said frame as a non-noisy or normal frame, and wherein when said frame complexity value is greater than said predefined complexity threshold, said method further comprises determining whether a target bitrate of said frame is less than a predefined bitrate threshold, wherein when said target bitrate of said frame exceeds said predefined bitrate threshold, said method comprises setting said noisy picture flag to "0", and when said target bitrate of said frame is less than said predefined bitrate threshold, said method comprises setting said noisy picture flag to "1", wherein said "1" noisy picture flag setting indicates that said frame includes said random noise portion.

19. The method of claim 16, wherein said evaluating comprises for each macroblock determining a macroblock activity level and determining when said macroblock activity level exceeds a predefined activity threshold, wherein said macroblock activity level exceeding said predefined activity threshold indicates that said macroblock is within said random noise portion of said frame.

20. The method of claim 19, wherein said adjusting encoding comprises performing motion estimation on said macroblock and selectively adjusting macroblock coding type for said macroblock to bias said macroblock towards being coded predictive when said macroblock activity level exceeds said predefined activity threshold, said selectively adjusting being with reference to a predictive error value resulting from said performing motion estimation on said macroblock, and further comprising determining an adjusted quantization level for said macroblock for use in encoding said macroblock, said adjusted quantization level being determined to reduce bits used in encoding said macroblock.

21. The method of claim 16, wherein said reducing bits comprises conserving bits used in encoding said at least some macroblocks within said random noise portion for use within said normal video portion of said frame.

22. A method for encoding a frame of a sequence of frames, each frame having a plurality of macroblocks, said method comprising:
    determining whether said frame includes a random noise portion; and
    when said frame includes said random noise portion, evaluating each macroblock of said plurality of macroblocks in said frame and adjusting encoding of at least some macroblocks in said frame and adjusting encoding of at least some macroblocks thereof within said random noise portion of said frame, said adjusting comprising reducing bits used in encoding said at least some macroblocks within said random noise portion;
    wherein each frame of the sequence of frames comprises a plurality of pixels, each pixel of each frame comprising a multi-bit value, and wherein said determining whether said claim includes said random noise portion includes calculating a frame complexity value and comparing said frame complexity value to a predefined complexity threshold, said calculating of said frame complexity value including deriving an accumulated absolute difference (PIX-DIFF) from adjacent pixels of said plurality of pixels of said frame; and
    wherein said deriving of said PIX-DIFF comprises forming a string of pixels by concatenating said plurality of pixels of said frame and defining PIX-DIFF as:

$$\sum_{y=1,3,5...}^{Max} |L_y - L_{y+1}|$$

where: L represents luminance value of a pixel, and y represents pixel position within the string of pixels.

23. A system for encoding a frame comprising a plurality of macroblocks, said system comprising:
    means for using intraframe statistics to determine without reference to another frame whether said frame includes a random noise portion and a normal video portion, and if so, then for each macroblock of said frame:
    (i) means for determining a macroblock activity level;
    (ii) means for determining when said macroblock activity level exceeds a predefined threshold, wherein said macroblock activity level exceeding said predefined threshold indicates that said macroblock is associated with said random noise portion of said frame; and
    (iii) means for adjusting encoding of said macroblock when said macroblock activity level exceeds said predefined threshold to conserve bits used in encoding said macroblock by biasing coding of said macroblock associated with said random noise portion of said frame towards predictive coding and thereby save bits otherwise used to encode said random noise portion of said frame and provide a more constant picture quality due to encoding of the frame.

24. The system of claim 23, wherein said system further comprises means for using said saved bits from said random noise portion of said frame to encode macroblocks associated with said normal portion of said frame.

25. The system of claim 23, wherein each macroblock of said plurality of macroblocks comprises multiple blocks, and wherein said means for determining (i) comprises means for determining an activity level for each block of said multiple blocks of said macroblock, and means for ordering activity levels of said multiple blocks of said macroblock and comparing a minimum activity level of said order with a next to minimum activity level of said order to derive an activity level for said macroblock.

26. The system of claim 23, wherein said means for adjusting encoding (iii) comprises means for performing motion estimation on said macroblock and for selectively adjusting macroblock coding type for said macroblock to bias said macroblock towards being coded predictive when said macroblock activity level exceeds said predefined threshold, said selectively adjusting being with reference to a predictive error value resulting from said performing of motion estimation on said macroblock.

27. A system for encoding a frame comprising a plurality of macroblocks, said system comprising:
    means for determining whether said frame includes a noisy portion, and if so, then for each macroblock of said frame:
    (i) means for determining a macroblock activity level;
    (ii) means for determining when said macroblock activity level exceeds a predefined threshold, wherein said macroblock activity level exceeding said predefined threshold indicates that said macroblock is associated with said noisy portion of said frame; and
    (iii) means for adjusting encoding of said macroblock when said macroblock activity level exceeds said predefined threshold to conserve bits used in encoding said macroblock and thereby save bits otherwise used to encode said noisy portion of said frame;
    wherein each macroblock of said plurality of macroblocks comprising multiple blocks, and wherein said means for determining (i) comprises means for determining an activity level for each block of said multiple blocks of said macroblock, and means for ordering activity levels of said multiple blocks of said macroblock and comparing a minimum activity level of said order with a next to minimum activity level of said order to derive an activity level for said macroblock; and
    wherein said means for comparing comprises means for determining whether said minimum activity level is less than one-half said next to minimum activity level and whether said minimum activity level is less than one-half an average activity level of said multiple blocks, and when both are true, for defining said activity level of said macroblock as said next to minimum activity level in said macroblock, otherwise for defining said activity level of said macroblock as said minimum activity level of said order.

28. A system for encoding a frame comprising a plurality of macroblocks, said system comprising:
    means for determining whether said frame includes a noisy portion, and if so, then for each macroblock of said frame:
    (i) means for determining a macroblock activity level;
    (ii) means for determining when said macroblock activity level exceeds a predefined threshold, wherein said macroblock activity level exceeding said predefined threshold indicates that said macroblock is associated with said noisy portion of said frame; and (iii) means for adjusting encoding of said macroblock when said macroblock activity level exceeds said predefined threshold to conserve bits used in encoding said macroblock and thereby save bits otherwise used to encode said noisy portion of said frame;

wherein said means for adjusting encoding (iii) comprises means for performing motion estimation on said macroblock and for selectively adjusting macroblock coding type for said macroblock to bias said macroblock towards being coded predictive when said macroblock activity level exceeds said predefined threshold, said selectively adjusting being with reference to a predictive error value resulting from said performing of motion estimation on said macroblock; and wherein said means for selectively adjusting comprises means for determining when said predictive error is greater than a second predefined threshold and when said predictive error is greater than one half said macroblock activity level, and when both are so, said means for selectively adjusting comprises means for adjusting a macroblock coding type parameter to bias said macroblock towards being coded predictive.

29. The system of claim 28, wherein said means for adjusting encoding (iii) further comprises means for determining an adjusted quantization level for use in encoding said macroblock, said adjusted quantization level being determined to conserve bits used in encoding said macroblock when said macroblock activity level exceeds said predefined threshold.

30. A system for encoding a frame of a sequence of frames, each frame having a plurality of macroblocks, said system comprising:
   a pre-encode processing unit for using intraframe statistics to determine without reference to another frame whether said frame includes a random noise portion and a normal video portion; and
   a control and encode unit for evaluating each macroblock of said plurality of macroblocks in said frame when said frame includes said random noise portion, said control and encode unit including means for adjusting encoding of at least some macroblocks within said random noise portion of said frame to reduce bits used in encoding said at least some macroblocks within said random noise portion by biasing coding thereof towards predictive coding.

31. The system of claim 30, wherein each frame of the sequence of frames comprises a plurality of pixels, each pixel of each frame comprising a multi-bit value, and wherein said pre-encode processing unit comprises means for deriving a frame complexity value and for comparing said frame complexity value to a predefined complexity threshold, said means for deriving of said frame complexity value including means for deriving an accumulated absolute difference (PIX-DIFF) from adjacent pixels of said plurality of pixels of said frame.

32. The system of claim 31, wherein said frame complexity value is less than said predefined complexity threshold, said pre-encode processing unit further comprises means for setting a noisy picture flag to "0" and performing normal encoding on said frame, wherein said flag set to "0" designates said frame as a non-noisy or normal frame, and when said frame complexity value is greater than said predefined complexity threshold, said pre-encode processing unit comprises means for determining whether a target bitrate of said frame is less than a predefined bitrate threshold, and when said target bitrate of said frame exceeds said predefined bitrate threshold, said pre-encode processing unit comprises means for setting said noisy picture flag to "0", and when said target bitrate of said frame is less than said predefined bitrate threshold, said pre-encode processing unit comprises means for setting said noisy picture flag to "1", wherein said "1" noisy picture flag setting indicates that said frame includes said random noise portion.

33. The system of claim 32, wherein said control and encode unit further comprises means for determining for each macroblock a macroblock activity level and for determining when said macroblock activity level exceeds a predefined activity threshold, wherein said macroblock activity level exceeding said predefined activity threshold indicates that said macroblock is within said random noise portion of said frame.

34. The system of claim 33, wherein said means for adjusting encoding comprises means for performing motion estimation on said macroblock and means for selectively adjusting macroblock coding type for said macroblock to bias said macroblock towards being coded predictive when said macroblock activity level exceeds said predefined activity threshold, said means for selectively adjusting being with reference to a predictive error value resulting from performing motion estimation on said macroblock, and wherein said control and encode unit further comprises means for determining an adjusted quantization level for said macroblock for use in encoding said macroblock, said adjusted quantization level being determined to reduce bits used in encoding said macroblock.

35. The system of claim 34, wherein said means for adjusting encoding comprises means for conserving bits used in encoding said at least some macroblocks within said random noise portion for use in encoding macroblocks within said normal video portion of said frame.

36. A computer program product comprising a computer usable medium having computer readable program code means therein for use in encoding a frame comprising a plurality of macroblocks, said computer readable program code means in said computer program product comprising:
   computer readable program code means for causing a computer to affect using intraframe statistics to determine without reference to another frame whether said frame includes a random noise portion and a normal video portion, and if so, then for each macroblock of said frame said computer program comprises:
   computer readable program code means for causing a computer to affect determining a macroblock activity level;
   computer readable program code means for causing a computer to affect determining when said macroblock activity level exceeds a predefined threshold, wherein said macroblock activity level exceeding said predefined threshold indicates that said macroblock is associated with said random noise portion of said frame; and
   computer readable program code means for causing a computer to affect adjusting encoding of said macroblock when said macroblock activity level exceeds said predefined threshold to conserve bits used in encoding said macroblock by biasing coding of said macroblock associated with said random noise portion of said frame towards predictive coding and thereby save bits otherwise used to encode said random noise portion of said frame and provide a more constant picture quality due to encoding of the frame.

37. A computer program product comprising computer usable medium having computer readable program code means therein for use in encoding a frame of a sequence of frames, each frame having a plurality of macroblocks, said computer readable program code means in said computer program product comprising:

computer readable program code means for causing a computer to affect using intraframe statistics to determine without reference to another frame whether said frame includes a random noise portion and a normal video portion; and computer readable program code means for causing a computer to affect evaluating each macroblock of said plurality of macroblocks in said frame and when said frame includes said random noise portion, adjusting encoding of at least some macroblocks within said random noise portion of said frame, said adjusting comprising reducing bits used in encoding said at least some macroblocks within said random noise portion by biasing coding thereof towards predictive coding.

* * * * *

UNITED STATES PATENT AND TRADEMARK OFFICE
CERTIFICATE OF CORRECTION

| | |
|---|---|
| PATENT NO. | : 7,016,413 B2 |
| APPLICATION NO. | : 09/046121 |
| DATED | : March 21, 2006 |
| INVENTOR(S) | : Hall et al. |

It is certified that error appears in the above-identified patent and that said Letters Patent is hereby corrected as shown below:

Claims:

Claim 22

Col. 15, lines 17 & 18, delete the words "in said frame and adjusting encoding of at leat some macroblocks" after the word " macroblocks"

Signed and Sealed this

First Day of August, 2006

JON W. DUDAS
*Director of the United States Patent and Trademark Office*